United States Patent [19]
Richards

[11] Patent Number: 4,544,603
[45] Date of Patent: Oct. 1, 1985

[54] REINFORCING ELEMENT FOR ELASTOMERIC ARTICLES AND ELASTOMERIC ARTICLES MADE

[75] Inventor: Jimmy L. Richards, Cuyahoga Falls, Ohio

[73] Assignee: The Goodyear Tire & Rubber Company, Akron, Ohio

[21] Appl. No.: 720,058

[22] Filed: Apr. 8, 1985

Related U.S. Application Data

[63] Continuation of Ser. No. 523,304, Aug. 15, 1983, abandoned.

[51] Int. Cl.$^4$ ............... D02G 3/00; B60C 5/00
[52] U.S. Cl. .................... 428/371; 428/222; 428/364; 57/902; 57/219; 152/548; 152/558
[58] Field of Search ........... 428/371, 222, 295, 364; 57/215, 219, 212, 608, 592, 625, 591, 902; 152/361 R, 359

[56] References Cited

U.S. PATENT DOCUMENTS

| | | | |
|---|---|---|---|
| 2,217,826 | 10/1940 | Laer | 152/359 |
| 2,598,033 | 5/1952 | Bourdon | 57/902 |
| 3,273,978 | 9/1966 | Paul | 428/222 |
| 3,805,508 | 4/1974 | Moderna | 57/902 |
| 3,848,406 | 12/1974 | Tabei et al. | 57/149 |
| 4,240,486 | 12/1980 | Schmit et al. | 152/359 |
| 4,470,251 | 9/1984 | Bettcher | 57/902 |

Primary Examiner—Marion E. McCamish
Assistant Examiner—Beverly K. Johnson
Attorney, Agent, or Firm—L. R. Drayer

[57] ABSTRACT

Reinforcing elements comprise a plurality of elongated metallic members, with substantially rectangular cross sections, having parallel longitudinal axes and at least one of the wide sides of each being contiguous with a wide side of another of said elongated metallic members. A single wrap member is helically disposed around the elongated metallic members such that each turn of the wrap filament member is spaced apart from the next adjacent turns of the wrap member. Elastomeric articles reinforced with these reinforcing elements are also disclosed.

12 Claims, 5 Drawing Figures

REINFORCING ELEMENT FOR ELASTOMERIC ARTICLES AND ELASTOMERIC ARTICLES MADE

This is a continuation, of application Ser. No. 523,304 filed Aug. 15, 1983, now abandoned.

BACKGROUND OF THE INVENTION

This invention relates generally to reinforcing elements and cables for elastomeric articles such as tires, hoses and belts, and more particularly to pneumatic tires and other elastomeric articles reinforced with such metallic reinforcing elements.

Metallic cables used for reinforcing elastomeric cables have commonly had circular, or substantially circular, cross sections. The use of stacked flat wires, for example in the belt structure of a pneumatic truck tire, enables a reduction in thickness without a significant reduction in stiffness and fatigue performance. However, the spacing, between reinforcing elements is the limiting factor in substituting flat wire cables for round cables, because there must be sufficient elastomeric material between adjacent reinforcing elements to prevent them from abrading against one another.

There is provided in accordance with an aspect of the invention a reinforcing element for an elastomeric article comprising a plurality of elongated metallic members having substantially rectangular cross sections, the longitudinal axes of said elongated metallic members being parallel to one another, a wide side of each said elongated metallic member being contiguous with a wide side of another of said elongated metallic members, the ratio of width to thickness of each said elongated metallic member being at least 2 to 1 but no greater than 10 to 1, and a wrap member helically disposed around said elongated metallic members such that each turn of said wrap member is spaced apart from the next adjacent turns of said wrap member.

There is provided in accordance with another aspect of the invention an elastomeric article comprising a plurality of reinforcing elements embedded in an elastomeric substance, each reinforcing element comprising a plurality of elongated metallic members having substantially rectangular cross sections, the longitudinal axes of said elongated metallic members being parallel to one another, a wide side of each said elongated metallic member being contiguous with a wide side of another of said elongated metallic members, the ratio of width to thickness of each said elongated metallic member being at least 2 to 1, but no greater than 10 to 1, and a wrap member helically disposed around said elongated metallic members such that each turn of said wrap member is spaced apart from the next adjacent turns of said wrap member.

BRIEF DESCRIPTION OF THE DRAWINGS

The invention will be better understood by referring to the figures of the drawing wherein.

DETAILED DESCRIPTION OF THE INVENTION

Figure 1:
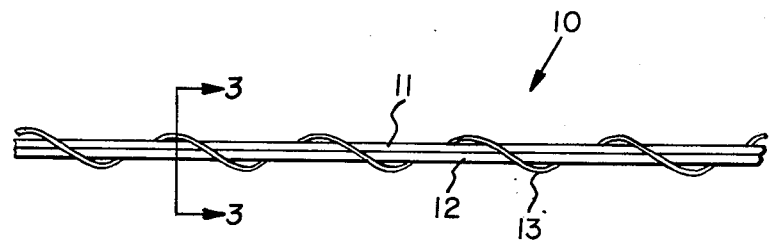
FIG. 1 is a side elevation view of a reinforcing element.
Figure 2:
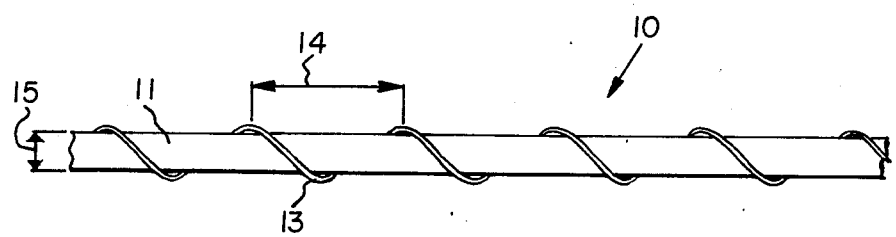
FIG. 2 is a top view of the reinforcing element of FIG. 1.
Figure 3:
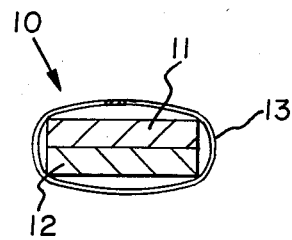
FIG. 3 is a cross-sectional view of the reinforcing element of FIGS. 1 and 2 taken along line 3—3 of FIG. 1.

Referring to FIGS. 1 and 2, there are shown side and top views, respectively, of a reinforcing element 10 for an elastomeric article such as a tire, a hose, or a belt. FIG. 3 is cross sectional view, along line 3—3 of FIG. 1. The reinforcing element comprises a plurality of elongated metallic members 11,12 having substantially rectangular cross sections. As used herein "substantially rectangular" is understood to mean that the opposite sides of a rectangle may vary slightly from being parallel or from being the exact same length, or that part, or all, of the corners of any, or all, of the elongated metallic members may be rounded off in order to facilitate manufacturing of the reinforcing members or improve their physical characteristics in an elastomeric article. While it is considered to be preferable that the widths of each elongated metallic member, as measured for example in FIG. 2 at 15, should be identical it is not considered to be critical to the invention. Elongated metallic members of the type used in the invention are sometimes referred to in the wire art as "flat wire", and when placed juxtaposed as in the invention are sometimes referred to as "stacked".

The longitudinal axes of the elongated metallic members are parallel to one another, and a wide side of each elongated metallic member is contiguous with, that is to say in physical contact with, a wide side of another elongated metallic member. As used herein and in the claims, a "wide side" of an elongated metallic member with a rectangular cross section is one of the longer sides of the rectangle, and the smallest distance between the wide sides of the rectangle is the thickness of the elongated metallic member. While in the embodiment illustrated there are two elongated metallic members, it is understood that a reinforcing element according to the invention may comprise two or more elongated metallic members. However, testing has indicated that a reinforcing element comprising four or more elongated metallic members may be impractical for certain uses, such as reinforcing a tire, because if the reinforcing element becomes too thick it may not flex adequately in directions perpendicular to the longitudinal axes of the elongated metallic members, or the members may slip from side to side so that the reinforcing element is misshaped. The ratio of width to thickness of each elongated metallic member should be at least 2 to 1 but no greater than 10 to 1. This ratio is critical because the reinforcing element is intended primarily for applications which will result in much bending thereof, and if the elongated metallic members are too thick they may be subject to premature fatigue failure. Preferably the thickness of the elongated metallic members will be 1.0 mm. or less, more preferably 0.5 mm. or less, and most preferably 0.25 mm. or less. For example, a reinforcing element has been manufactured according to the invention using elongated metallic members having a width of 1.5 mm. and a thickness of 0.22 mm. Preferably the elongated metallic members have identical cross-sectional dimensions, but their widths and thicknesses may vary slightly without deviating from the scope of the invention.

A single wrap member 13 is helically disposed around the elongated metallic members 11, 12 such that each turn of the wrap member is spaced apart from the next adjacent turns of the wrap member. It is understood that the helix of the wrap member may be distorted from a perfect cylindrical helix without deviating from the scope of the invention, but that preferably each turn of the wrap member is spaced apart from the next adjacent turns, as measured at 14, in a direction parallel to the longitudinal axes of the elongated metallic members, that is at least equal to the width of one of the elongated metallic members, as measured at 15. More preferably the spacing between turns of the wrap member is at least two times the width of one of the elongated metallic members. The wrap member may comprise any suitable material such as nylon, aramid, or metal, and may be either multifilament or monofilament. The cross-sectional shape may be round, oval, rectangular or any other suitable shape. The wrap member may even comprise a fabric woven from a suitable material or a perforated strip without deviating from the scope of the invention. Preferably the wrap member is metallic and has a circular cross section with a diameter that is less than the thickness of one of the elongated metallic members. For example, tests were made on reinforcing elements manufactured according to the invention in which the elongated metallic members had a thickness of 0.22 mm. and a width of 1.5 mm., with the wrap member comprising a single metallic filament with a diameter of 0.15 mm. The spacing between the turns of the wrap member is important because it has a direct effect upon the flexing and fatigue characteristics of the reinforcing element.

Table I illustrates the effect of spacing between turns of the wrap member on fatigue, as determined by a 3 roll fatigue test, for reinforcing elements comprising three elongated metallic members of 1.5 mm.×0.22 mm. and a 0.15 mm. diameter metallic filament as a wrap member.

TABLE I

| Spacing Between Turns | Cycles to Failure |
| --- | --- |
| 2.0 mm | 7,280 |
| 3.5 mm | 8,522 |
| 7.0 mm | 10,015 |

Table II illustrates the effect of spacing between turns of the wrap member on Tabor stiffness, as determined per ASTM test D2969, of the reinforcing elements comprising three elongated metallic members of 1.5 mm.×0.22 mm. and a 0.15 mm. diameter metallic filament as a wrap member.

TABLE II

| Spacing Between Turns | Tabor Stiffness (grams) |
| --- | --- |
| 2.0 mm | 193 |
| 3.5 mm | 124 |
| 7.0 mm | 132 |

From the test results summarized in Tables I and II, it is concluded that increased spacing between the turns of the wrap member reduces the stiffness and improves the fatigue performance of the reinforcing elements. Of course, as illustrated in Table II, the elongated metallic elements have an inherent Tabor stiffness that cannot be reduced by increasing the spacing between turns of wrap member over a certain distance.

It is believed that the physical characteristics of a reinforcing element according to the invention may be most advantageously employed by using the reinforcing elements in a pneumatic tire, but their usefulness also extends to belts, hoses and other elastomeric articles.

Figure 4:
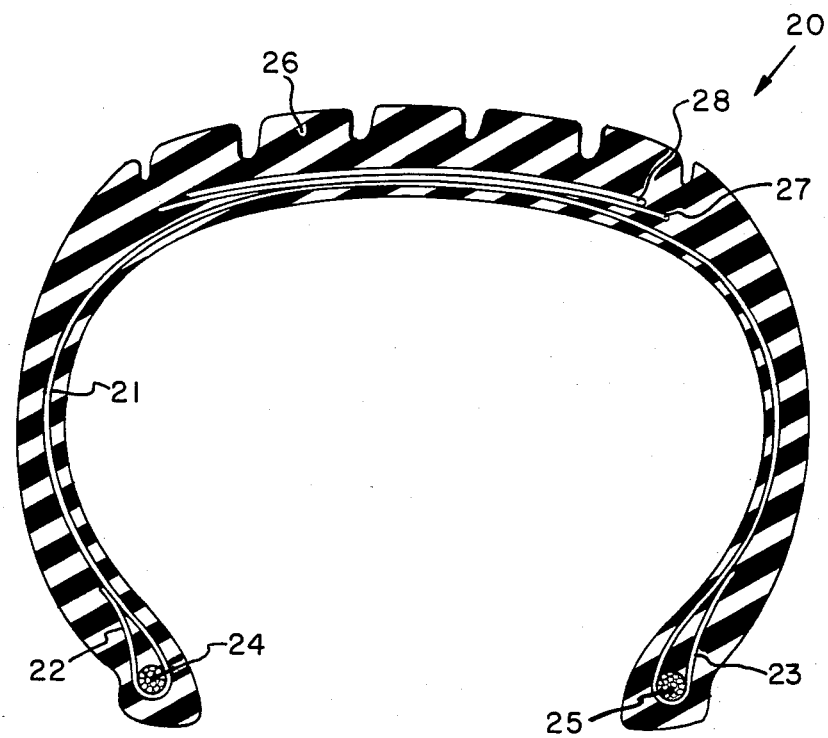
FIG. 4 is a radial cross-sectional view of a pneumatic tire according to the invention.

FIG. 4 is a radial cross-sectional view of a pneumatic tire 20 comprising a plurality of reinforcing elements of the type already described herein embedded in an elastomeric substance such as natural or synthetic rubber. The pneumatic tire illustrated in FIG. 4 is a radial tire, but it is understood that a pneumatic tire with reinforcing elements according to the invention may be of the radial, bias, or bias-belted types without deviating from the scope of the invention. As used herein a radial tire is understood to mean a tire in which the parallel reinforcing elements of the carcass ply 21 are disposed at an angle of between 75 and 90 degrees with respect to the mid-circumferential plane of the tire. The carcass ply 21 has a pair of axial edge portions 22,23 and each axial edge portion is anchored around an annular bead 24,25. As used herein "axial" and "axially" refer to directions parallel to the axis of rotation of a tire, and "radial" and "radially" refer to directions perpendicular to the axis of rotation of a tire.

The pneumatic tire 20 of FIG. 4 has a ground engaging tread portion 26 extending circumferentially thereabout, and a plurality of circumferentially extending tread reinforcing plies 27,28 disposed radially inwardly of the ground engaging tread portion. While the tire illustrated in FIG. 4 has a plurality of tread reinforcing plies, it is understood that a pneumatic tire according to the invention may comprise only a single tread reinforcing ply, or more than two tread reinforcing plies without deviating from the scope of the invention. The tread reinforcing ply, or plies, may comprise a plurality of parallel reinforcing elements of the type described herein. In a radial tire a tread reinforcing ply is commonly referred to as a belt ply, which is understood to mean that the reinforcing elements of the tread reinforcing ply are disposed at a significantly lower angle with respect to the mid-circumferential plane of the tire than the reinforcing elements of the carcass ply.

It is understood that in a pneumatic tire according to the invention comprising a plurality of reinforcing elements of the type disclosed herein embedded in an elastomeric substance, either in the carcass ply alone, or in a tread reinforcing ply alone, or in both the carcass ply and at least one tread reinforcing ply may comprise a plurality of said herein disclosed reinforcing elements. Of course, any other reinforcing component of a pneumatic tire, such as a sidewall reinforcement, or bead area reinforcement comprising a plurality of said herein disclosed reinforcing elements also is understood to be within the broad scope of the invention even if neither the carcass ply nor the tread reinforcing ply comprises said herein disclosed reinforcing elements.

Figure 5:
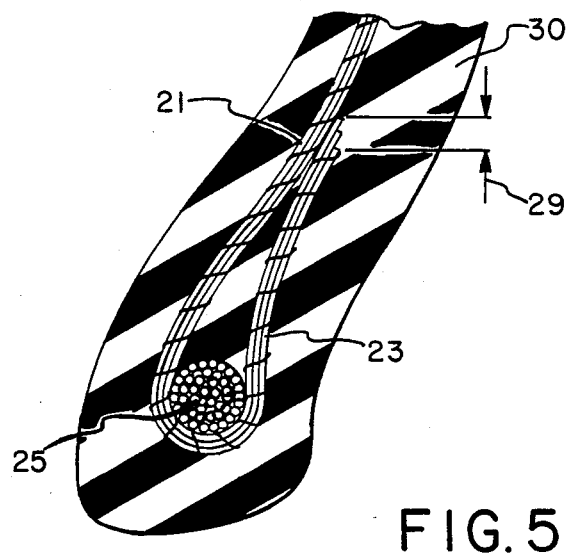
FIG. 5 is an enlarged fragmentary view of one of the bead portions of the tire illustrated in FIG. 4.

By referring to FIG. 5, which is an enlarged fragmentary view of one of the bead portions of the tire 20 illustrated in FIG. 4, another advantage of the invention may be pointed out. In all embodiments of a pneumatic tire according to the invention the wide sides of the elongated metallic members, also referred to as flat wire in the art, are oriented facing the internal cavity of the tire and external surfaces of the tire respectively, while the thin sides of adjacent reinforcing elements are oriented facing one another, regardless of whether the reinforcing elements comprise the carcass ply, tread reinforcing ply, or any other component. This orientation makes the best use of the bending and flexing characteristics of the reinforcing elements. When the carcass of a radial pneumatic tire is expanded from a substantially cylindrical shape to a toroidal-like shape during the manufacturing process the distance from the axial edge of the carcass ply to the top of the bead core changes. If reinforcing elements of the type disclosed herein are used in the carcass ply, a natural step-down 29 occurs at the edge of the carcass ply due to the radius of the reinforcing element around the annular bead increasing by the thickness of the elongated metallic members and the freedom of the elongated metallic members to move with respect to their longitudinal axes in the reinforcing element. If, for example, the reinforcing element comprises three elongated metallic members, the stresses at the end of the reinforcing element will be dissipated over a larger area to decrease the likelihood of failure of the tire structure at this location, and to increase the area of the interface between the reinforcing element and the surrounding elastomeric material 30.

The flex and stiffness characteristics of the reinforcing elements for the various tire components may be selected by a tire engineer in accordance with good engineering practice, and the width to thickness ratio of the elongated metallic members and the spacing between turns of the wrap member selected accordingly.

The reinforcing elements may be embedded in an elastomeric substance by creel calendering, in a manner that is well known in the tire manufacturing technology.

Elastomeric articles, that is to say articles comprised primarily of elastomeric substances such as natural or synthetic rubber, other than tires that are reinforced with reinforcing elements of the types disclosed herein are also considered to be within the scope of the present invention. Such articles include, but are not limited to, hoses and belts.

While certain representative embodiments and details have been shown for the purpose of illustrating the invention, it will be apparent to those skilled in the art that various changes and modifications may be made therein without departing from the spirit or scope of the invention.

What is claimed is:

1. A reinforcing element for an elastomeric article comprising a plurality of elongated metallic members having substantially rectangular cross sections of identical width, the longitudinal axes of said elongated metallic members being parallel to one another, a wide side of each said elongated metallic member being contiguous with a wide side of another of said elongated metallic members, the ratio of width to thickness of each said elongated metallic member being at least 2 to 1 but no greater than 10 to 1, and a wrap member helically disposed around said elongated metallic members such that each turn of said wrap member is spaced apart from the next adjacent turns of said wrap member a distance, as measured in a direction parallel to the longitudinal axes of said elongated metallic members, that is at least equal to the width of one of said elongated metallic members.

2. A reinforcing element for an elastomeric article according to claim 1 wherein each said elongated metallic member has a thickness of 1.0 mm. or less.

3. A reinforcing element for an elastomeric article according to claim 1 wherein each said elongated metallic member has a thickness of 0.5 mm. or less.

4. A reinforcing element for an elastomeric article according to claim 1 wherein each said elongated metallic member has a thickness of 0.25 mm. or less.

5. A reinforcing element for an elastomeric article according to claim 1 wherein said elongated metallic members have identical cross-sectional dimensions.

6. A reinforcing element for an elastomeric article according to claim 2 wherein said elongated metallic members have identical cross-sectional dimensions.

7. A reinforcing element for an elastomeric article according to claim 3 wherein said elongated metallic members have identical cross-sectional dimensions.

8. A reinforcing element for an elastomeric article according to claim 4 wherein said elongated metallic members have identical cross-sectional dimensions.

9. A reinforcing element for an elastomeric article according to any one of claims 1 through 8 wherein said wrap member is metallic.

10. A reinforcing element for an elastomeric article according to any one of claims 1 through 8 wherein each turn of said wrap member is spaced apart from the next adjacent turns a distance, as measured in a direction parallel to the longitudinal axes of said elongated metallic members, that is at least two times the width of one of said elongated metallic members.

11. A reinforcing element for an elastomeric article according to of claim 9 wherein said metallic wrap member has a circular cross section with a diameter that is less than the thickness of one of said elongated metallic members.

12. A reinforcing element for an elastomeric article according to claim 11 wherein each turn of said metallic wrap member is spaced apart from the next adjacent turns a distance, as measured in a direction parallel to the longitudinal axes of said elongated metallic members, that is at least two times the width of one of said elongated metallic members.

* * * * *